United States Patent [19]

Takeuchi et al.

[11] Patent Number: 4,792,243
[45] Date of Patent: Dec. 20, 1988

[54] BEARING

[75] Inventors: Masamichi Takeuchi; Junichi Nakajima, both of Osaka, Japan

[73] Assignee: Koyo Seiko Co., Ltd., Osaka, Japan

[21] Appl. No.: 52,056

[22] Filed: May 21, 1987

[30] Foreign Application Priority Data

May 24, 1986 [JP] Japan ................. 61-119602

[51] Int. Cl.⁴ ............ F16C 33/78; F16C 33/74; F16J 15/32; F16J 15/40
[52] U.S. Cl. .................. 384/486; 277/135; 277/152; 384/132
[58] Field of Search ......... 384/132, 139, 143, 147, 384/151, 153, 477, 478, 481–486; 277/135, 13, 17, 18, 152, 153, 95, 38, 51

[56] References Cited

U.S. PATENT DOCUMENTS

| 2,177,441 | 10/1939 | Pesarese | 277/152 |
| 3,396,977 | 8/1968 | Iguchi | 384/477 X |
| 3,415,581 | 12/1968 | Seubert | 384/147 X |
| 3,438,639 | 4/1969 | Paulsen | 384/486 X |
| 3,601,411 | 8/1971 | Bourgeois | 277/82 |
| 3,639,016 | 2/1972 | Bourgeois | |
| 3,681,142 | 8/1972 | Schmitt | 277/153 X |
| 3,770,993 | 11/1973 | Schultenkamper | 384/484 |
| 4,395,141 | 7/1983 | Pietsch et al. | 384/132 |
| 4,447,094 | 5/1984 | Trudeau | 384/145 |

FOREIGN PATENT DOCUMENTS

| 0051170 | 5/1982 | European Pat. Off. | 384/486 |
| 0770716 | 3/1957 | United Kingdom | 384/478 |
| 2130310 | 5/1984 | United Kingdom | 384/486 |

Primary Examiner—Stuart S. Levy
Assistant Examiner—Thomas R. Hannon
Attorney, Agent, or Firm—Saidman, Sterne, Kessler & Goldstein

[57] ABSTRACT

A bearing, having an inner ring, an outer ring, rolling members, inner seal members, outer seal members, a first grease having good heat resistance which is contained inward of the inner seal member, and a second grease having water-resistance and corrosion-prevention which is contained between the inner seal member and the outer seal member. The second grease prevents rusting in the outer and inner rings even if water enters the inner side of the outer seal member. The first grease assures satisfactory lubrication of the rolling members, the outer and inner rings under high speed and high temperature conditions.

3 Claims, 3 Drawing Sheets

BEARING

BACKGROUND OF THE INVENTION

The present invention relates to a bearing for use in high speed operation under high-temperature and, mud and water splashing conditions.

Bearings for use in automobiles, such as, for example, propeller-shaft support center bearings, drive-shaft center bearings, wheel bearings, alternator bearings, and bearings for an auxiliary device, are required to withstand high-speed and high-temperature conditions and also to have high anti-mud and sealing properties.

One typical prior-art bearing of this kind is shown in FIG. 3. Such bearings comprise a plurality of balls 3 arranged in circumferentially spaced apart relation between an inner ring 1 and an outer ring 2, a ring shaped outer seal member 6 having an inner circumferential portion 6a fitted in a support groove 4 of the inner ring 1 and an outer circumferential portion 6b held in slide contact with an inner periphery 2a of the outer ring 2, and a ring shaped inner seal member 7 having an outer circumferential portion 7a fitted in a support groove 5 of the outer ring 2 and an inner circumferential portion 7b held in slide contact with an outer periphery 1a of the inner ring 1. A kind of grease $G_1$, e.g., a heat-resistant grease, is contained in a space 8 defined between the outer seal member 6 and the inner seal member 7 and also in a space 9 defined in cooperation with the balls 3, the inner seal member 7 and the inner and outer rings 1, 2.

Because of the heat resistant grease $G_1$ contained in the space 8 between the outer seal member 6 and the inner seal member 7 and in the space 9 inward of the inner seal member 7, however, such conventional bearing has a drawback that it is not well resistant to water and corrosion; if water, mud, or the like from an external source deposits on the slide contact portion between the outer circumferential portion 6b of the outer seal member 6 and the inner periphery 2a of the outer ring 2, pitting is likely to develop on the slide contact portion, the outer circumferential portion 6b of the outer seal member 6 being thus deteriorated in sealing properties, which fact in turn leads to deterioration of the inner seal member 7 in water resistance.

In the present state of the art, there is no grease well qualified to meet the heat resistance requirements on one hand and the water-resistant and corrosion-preventive requirements on the other hand.

SUMMARY OF THE INVENTION

Accordingly, the object of the present invention is to provide a bearing in which two kinds of greases, for example, one having good heat resistance and the other having good water-resistant and corrosion-preventive properties, are used, whereby rusting is prevented and seal members are long protected from any unfavorable effect of water, while good lubrication is assured under high speed and high temperature conditions.

In order to accomplish the object, the bearing in accordance with the invention comprises inner and outer rings positioned one inside the other; a plurality of rolling members positioned between the outer and inner rings and spaced a distance from each other in a circumferential direction of the outer and inner rings; inner and outer seal members positioned in at least one side of any one of the outer and inner rings, said inner seal members defining a first space in cooperation with the rolling members and the inner and outer rings, said outer seal members defining a second space in cooperation with the inner seal members and the inner and outer rings, said second space being positioned between the inner and outer seal members; a first grease contained in the first space; and a second grease contained in the second space, said first grease having properties different from said second grease.

In the bearing, the second grease contained in the space between the inner and outer seal members provides, for example, high water-resistance and corrosion-prevention. Therefore, water, mud, and the like are unlikely to enter the interior, and if they enter the space at all passing through the outer seal member, the second grease prevents pitting. Further, the first grease, a heat resistant grease, for example, which is contained inward of the inner seal member, helps maintain good lubrication between the inner and outer rings and the rolling members.

The above and other objects and features of the present invention will become apparent from the following description taken in conjunction with the preferred embodiments thereof with reference to the accompanying drawings.

DETAILED DESCRIPTION OF THE PREFERRED EMBODIMENTS

Figure 1:
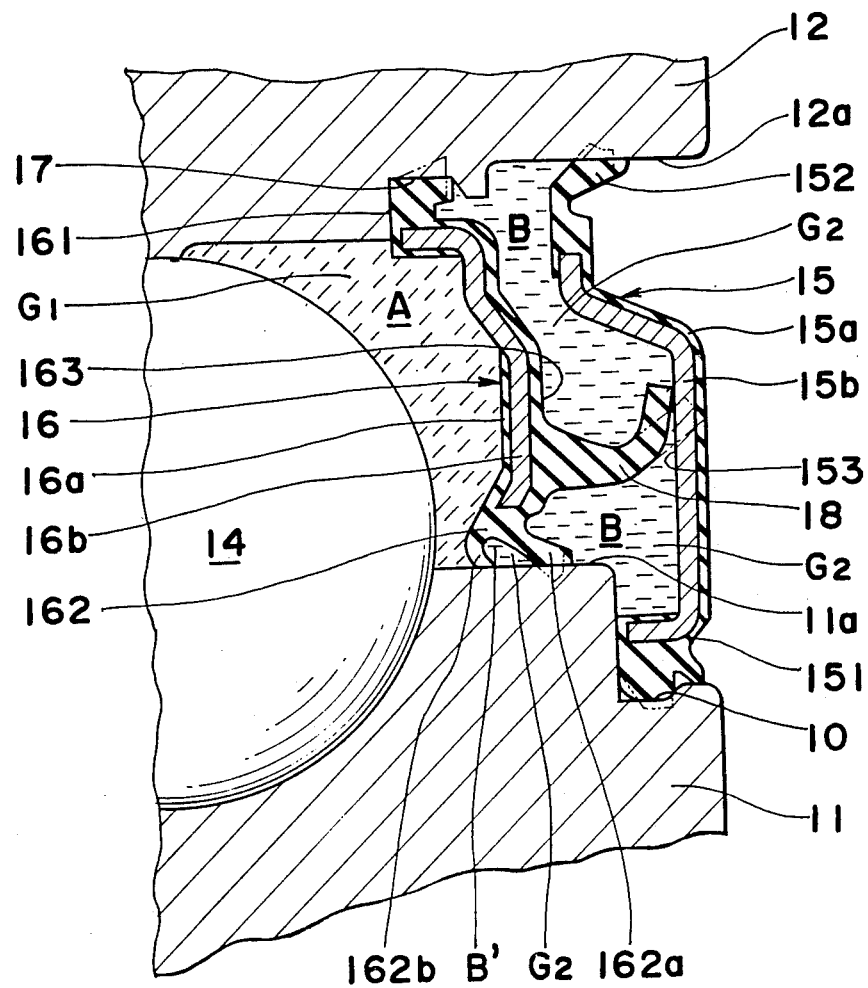
FIG. 1 is a sectional view of a bearing representing one embodiment of the invention.

Before the description of the present invention proceeds, it is to be noted that the like parts are designated by like reference numerals throughout the accompanying drawings.

In FIG. 1, reference numeral 11 designates an inner ring, reference numeral 12 designates an outer ring, reference numeral 14 designates rolling members in the form of balls (only one of which is shown) arranged in circumferentially spaced apart relation between the inner ring 11 and the outer ring 12, and reference numeral 15 is a ring-shaped outer seal member consisting of a rubber portion 15a and a core metal portion 15b. An inner circumferential portion 151 of the rubber portion 15a of the outer seal member 15 is fitted in a support groove 10 in an outer periphery 11a of the inner ring 11, and an outer circumferential portion 152 of the rubber portion 15a is in slide contact with an inner periphery 12a of the outer ring 12. A ring-shaped inner seal member 16 consists of a rubber portion 16a and a core metal portion 16b. An outer circumferential portion 161 of the rubber portion 16a is fitted in a support groove 17 in an inner periphery 12a of the outer ring 12, and a bifurcated inner circumferential portion 162 of the rubber portion 16a is in slide contact with the inner periphery 11a of the inner ring 11. The inner seal member 16, in its outer surface 163, is provided with a projection 18, the front end of which is in slide contact with an inner surface 153 of the outer seal member 15.

A first grease $G_1$ having heat resistant properties is contained in a space A defined inward of the inner seal member 16, and a second grease $G_2$ having high water-resistant and corrosion-preventive properties is contained or applied in a space B defined between the outer seal member 15 and the inner seal member 16 and also in a space B' defined between the bifurcated inner circumferential portion 162 of the inner seal member 16 and the outer periphery 11a of the inner ring 11.

Since the first and second greases $G_1$, $G_2$ having different properties are, respectively, contained or applied in the space A and in the spaces B, B', entry of water, mud, or the like can be effectively prevented by the second $G_2$ and the good lubrication of the balls 14, etc. under high speed and high temperature conditions can be assured by the first grease $G_1$. Even if water or the like enters the spaces B, B' through the slide contact portion between the outer seal member 15 and the outer ring 12, the water-resistant and corrosion-preventive second grease $G_2$ contained in the spaces B, B' provides surface protection of both the slide contact portion of the outer ring 12 and the slide contact portion of the inner ring 11; therefore, pitting can be effectively prevented. Especially the bifurcated inner circumferential portion 162 of the inner seal member 16 provides double protection against entry of water. The water-resistive and corrosion-preventive second grease $G_2$ contained in the portion enclosed by the bifurcated inner circumferential portion 162 prevents pitting in the area between the outer and inner portions 162a and 162b of the bifurcated inner circumferential portion 162.

Figure 2:
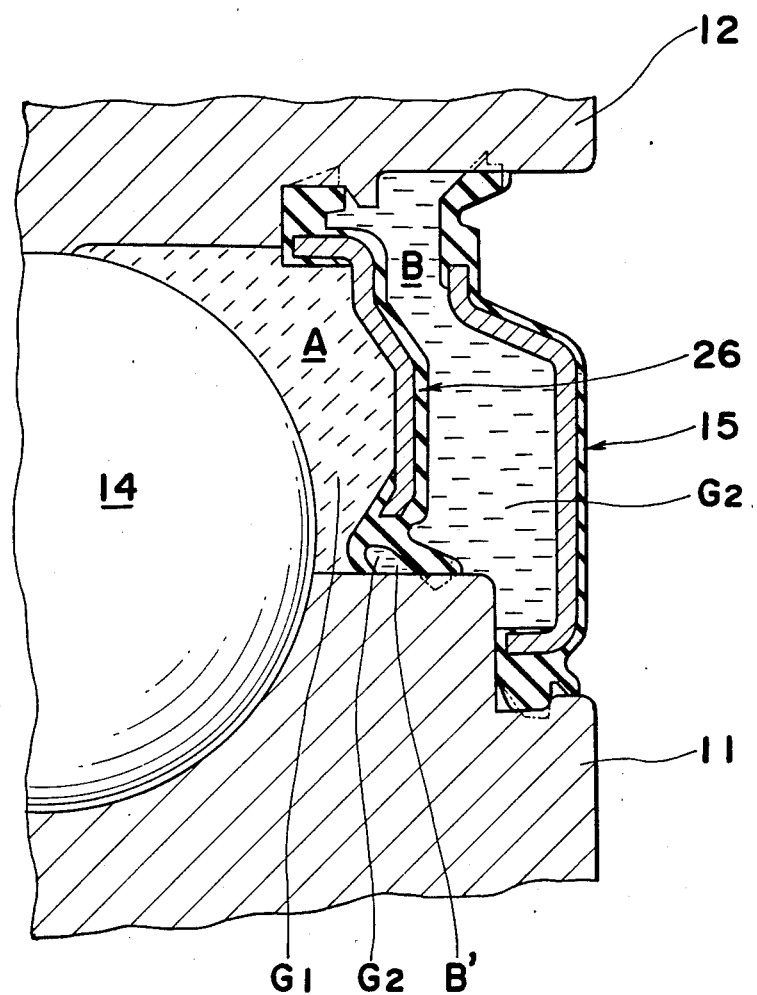
FIG. 2 is a sectional view showing another embodiment of the invention.
Figure 3:
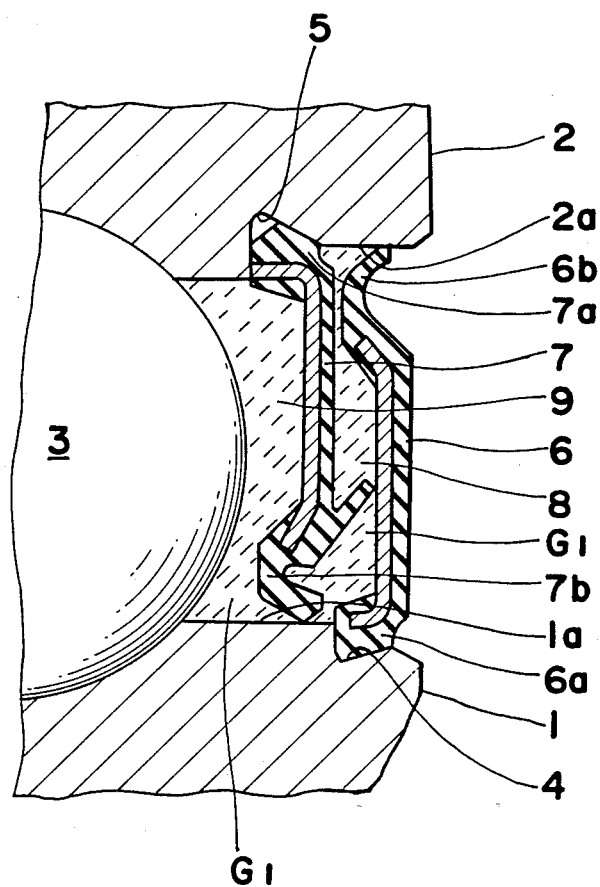
FIG. 3 is a sectional view showing a conventional type of bearing.

FIG. 2 is a sectional view showing another embodiment of the invention. The bearing of this embodiment comprises an inner seal member 26 which corresponds to the inner seal member 16 of the foregoing embodiment from which the projection 18 is removed. The water-resistive and corrosion-preventive second grease $G_2$ is contained in the space B between the inner seal member 26 and an outer seal member 15. In other respects, the second embodiment is identical with the first embodiment. Therefore, description is omitted of the other parts thereof which are designated by corresponding reference numeals.

It is to be noted that greases $G_1$, $G_2$ may be contained either closely or loosely in the spaces A and B. The rolling members may be in the form of either balls or rollers.

As may be clearly understood from the foregoing description, the bearing in accordance with the invention comprises a first grease having good heat resistance which is contained in a first space defined inward of an inner seal member, and a second grease having water-resistive and corrosion-preventive properties contained in a second space defind between the inner and outer seal members. Therefore, water, mud, or the like is unlikely to enter the interior, and even if water and the like enter the second space through the clearance between the outer seal member and the outer or inner ring, the second grease contained in the second space protects the respective peripheries of the outer and inner rings against rust development to ensure good performance of the outer and inner seal members over a long period of time. Further, the first grease contained in the space inward of the inner seal member assures satisfactory lubrication of the roll members and races of the inner and outer rings under high speed and high temperature conditions.

Although the present invention has been described in connection with the preferred embodiments thereof, many variations and modifications will now become apparent to those skilled in the art. It is preferred, therefore, that the present invention is limited not by the specific disclosure herein, but only by the appended claim.

What is claimed is:

1. A bearing comprising:
   inner and outer raceway rings positioned one inside the other;
   a plurality of rolling members positioned between the outer and inner raceway rings and spaced a distance from each other in a circumferential direction of the outer and inner rings;
   inner and outer seal members positioned in at least one side of any one of the outer and inner raceway rings, said inner seal members defining a first space in cooperation with the rolling members and the inner and outer raceway rings, said outer seal members defining a second space in cooperation with the inner seal members and the inner and outer rings, said second space being positioned between the inner and outer seal members;
   a first grease contained in the first space; and
   a second grease contained in the second space, said first grease having properties different from said second grease.

2. A bearing as set forth in claim 1, wherein the first grease is a heat-resistant grease and the second grease is a water-resistant and corrosion-preventive grease.

3. A bearing means as set forth in claim 2, wherein the inner seal member has an outer circumferential portion fixed to the outer raceway ring and a bifurcated inner circumferential portion held in sliding contact with the inner raceway ring, and wherein a water-resistant and corrosion-preventive grease is contained in a space defined between the bifurcated inner circumferential portion and the outer periphery of the inner raceway ring.

* * * * *